(12) United States Patent
Carter et al.

(10) Patent No.: US 9,135,444 B2
(45) Date of Patent: Sep. 15, 2015

(54) TRUSTED PLATFORM MODULE (TPM) ASSISTED DATA CENTER MANAGEMENT

(75) Inventors: Stephen R Carter, Spanish Fork, UT (US); Tammy Anita Green, Provo, UT (US); Scott Alan Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 1239 days.

(21) Appl. No.: 12/259,382

(22) Filed: Oct. 28, 2008

(65) Prior Publication Data

US 2009/0064292 A1 Mar. 5, 2009

Related U.S. Application Data (63) Continuation-in-part of application No. 11/583,667, filed on Oct. 19, 2006.

(51) Int. Cl.
*H04L 29/06* (2006.01)
*G06F 21/57* (2013.01)
*G06F 21/33* (2013.01)

(52) U.S. Cl.
CPC .............. *G06F 21/57* (2013.01); *G06F 21/33* (2013.01)

(58) Field of Classification Search
CPC .................................. G06F 21/57; G06F 21/33
USPC .......................................................... 726/10
See application file for complete search history.

(56) References Cited

U.S. PATENT DOCUMENTS

| | | | |
|---|---|---|---|
| 5,619,657 A | 4/1997 | Sudama et al. | |
| 5,684,950 A | 11/1997 | Dare et al. | |
| 5,832,487 A | 11/1998 | Olds et al. | |
| 6,014,667 A | 1/2000 | Jenkins et al. | |
| 6,157,925 A | 12/2000 | Jenkins et al. | |
| 6,778,498 B2 | 8/2004 | McDysan | |
| 6,829,654 B1 | 12/2004 | Jungck | |
| 7,117,535 B1 | 10/2006 | Wecker | |
| 7,216,369 B2 | 5/2007 | Wiseman et al. | |
| 7,275,263 B2 | 9/2007 | Bajikar et al. | |
| 7,380,119 B2 | 5/2008 | Bade et al. | |

(Continued)

FOREIGN PATENT DOCUMENTS

WO    WO-0069110    11/2000

OTHER PUBLICATIONS

"European Patent Application Serial No. 07117394.2-122 1914658, Extended European Search Report dated Aug. 25, 2008", 9 pgs.

*Primary Examiner* — Jeffrey D Popham
(74) *Attorney, Agent, or Firm* — Schwegman Lundberg & Woessner, P.A.

(57) ABSTRACT

Techniques for trusted platform module (TPM) assisted data center management are provided. A data center registers TPM remote attestations for physical processing environments of physical devices within a data center. Each time a physical processing environment is established; a new TPM remote attestation is generated and validated against the registered TPM remote attestation. Additionally, during registration other identifying information is supplied to the physical processing environments that permit each physical processing environment to be authenticated, validated, and controlled via unique identities. Inter-data center communication is established for sharing virtual processing environments and administrative operations are authenticated within each of the data centers perform any administrative operation is permitted to process within a particular data center.

12 Claims, 4 Drawing Sheets

(56) References Cited

U.S. PATENT DOCUMENTS

| | | | |
|---|---|---|---|
| 7,685,206 B1 | 3/2010 | Mathew et al. | |
| 7,698,400 B1 | 4/2010 | Beloussov et al. | |
| 8,528,107 B1* | 9/2013 | Ginzton et al. | 726/29 |
| 2002/0075306 A1 | 6/2002 | Thompson et al. | |
| 2003/0088574 A1 | 5/2003 | White et al. | |
| 2004/0051467 A1* | 3/2004 | Balasubramaniam et al. | 315/149 |
| 2004/0230799 A1 | 11/2004 | Davis | |
| 2004/0259277 A1 | 12/2004 | Hofmeister | |
| 2005/0086473 A1* | 4/2005 | Barkley et al. | 713/170 |
| 2005/0138423 A1* | 6/2005 | Ranganathan | 713/201 |
| 2005/0149729 A1* | 7/2005 | Zimmer et al. | 713/168 |
| 2005/0223007 A1* | 10/2005 | Zimmer et al. | 707/9 |
| 2005/0246708 A1 | 11/2005 | Turner et al. | |
| 2005/0268093 A1 | 12/2005 | Proudler | |
| 2005/0289471 A1 | 12/2005 | Thompson et al. | |
| 2006/0050888 A1 | 3/2006 | Svensson | |
| 2006/0144927 A1 | 7/2006 | Love et al. | |
| 2006/0200424 A1 | 9/2006 | Cameron et al. | |
| 2006/0212934 A1 | 9/2006 | Cameron et al. | |
| 2007/0094719 A1 | 4/2007 | Scarlata | |
| 2007/0300069 A1 | 12/2007 | Rozas | |
| 2008/0098392 A1 | 4/2008 | Wipfel et al. | |
| 2008/0098457 A1 | 4/2008 | Carter | |
| 2008/0098462 A1 | 4/2008 | Carter | |

* cited by examiner

TRUSTED PLATFORM MODULE (TPM) ASSISTED DATA CENTER MANAGEMENT

RELATED APPLICATIONS

The present invention is co-pending with and is a Continuation-In Part of U.S. application Ser. No. 11/583,667 entitled "Identity Controlled Data Center," filed on Oct. 19, 2006; the disclosure of which is incorporated by reference herein.

BACKGROUND

Increasingly enterprises are attempting to utilize existing technology to conduct business and affairs in a remote and more automated manner. For example, enterprises are now capable of deploying software services to remote facilities or customers over the Internet.

One problem with seamlessly providing services over a network is that each service or package of services that is to be deployed has to be pre-configured for the physical environment in which the service will be installed. That is, the target physical environment may have a specific operating system, a specific file system, etc., such that the deployed service requires pre-configuration before it can be distributed and deployed in an automated manner on the target environment. This custom and often manual configuration negates many of the benefits associated with automated service deployment.

Another more pressing problem arises with respect to security. Enterprises do not want to deploy services on rogue environments and do not want their deployed services to be compromised for purposes of proliferating viruses or other harmful effects within legitimate environments. By automating distribution and deployment of services, the services naturally become targets of nefarious individuals that seek to compromise the services or use the services to their illegal advantages in some manner.

Consequently, enterprises have attempted to use a variety of conventional techniques to minimize their exposure when deploying services over the Internet. For example, the services may include digital certificates, digital signatures, and/or may be encrypted. Yet, keys often used for security measures may themselves be exposed on a network wire during a transaction and if they are not they still can be discovered within the target physical environment in which they are used. So, if a target physical environment becomes compromised by an intruder, then the physical environment's keys can likewise be compromised, at which point the physical environment and any deployed services can also be potentially compromised.

Still, the modern enterprise is rapidly embracing virtualization for the abovementioned reasons and for a variety of other reasons as well, such as for reducing cooling costs, decreasing carbon footprints, decreasing energy consumption, increasing computing and storage availability, etc. In other words, the "Green Data Center" is become a mandate rather than an ecological statement. But as stated above, virtualization does not come without some costs, such as increased complexity and increased exposure to security attacks on both virtual and physical systems. For example, if a hacker can penetrate a virtualized system to run on a virtualized host machine under the hacker's control and direction, then much harm can be done without the owner of the virtualized system's knowledge.

Thus, improved data center management techniques are needed.

SUMMARY

In various embodiments, techniques for trusted platform module (TPM) assisted data center management are provided. More specifically, and in an embodiment, a method is provided for TPM assisted data center management. A physical processing environment is established, and the physical processing environment is also configured for hosting virtual processing environments associated with virtual machines on a physical device. A trusted platform module (TPM) remote attestation is received from the physical device and used for a configuration of the physical processing environment on the physical device. Next, identifying information is supplied back to the physical device and the physical processing environment in response to the TPM remote attestation. The physical device and the physical processing environment subsequently use the identifying information to authenticate to and securely interact with a remote data center.

DETAILED DESCRIPTION

A "resource" includes a user, content, a processing device, a node, a service, an application, a system, a directory, a data store, groups of users, combinations of these things, etc. Resources can interact with each other and can either act on other resource or be acted upon by other resources. The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) or a wide-area network (WAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment when that phrase is not preceded by the term "virtual."

A "virtual processing environment" refers to a software constructed sub processing environment that is carved out from or superimposed on a portion of a physical processing environment. A single physical processing environment can have a plurality of different or cloned "virtual processing environments."

The processing environments (physical and virtual) as used herein are configured to participate in a virtualized data center. A "virtualized data center" refers to a platform or environment for executing one or more similar services or applications. For example, an enterprise may deploy a suite of services for use, some of the service may be related to administration, audit tracking, security, maintenance, etc. of other ones of the deployed services. Thus, the platform or environment can include a variety of services, some of which may share features and some of which may be independent of the other services. As used herein "data center" and "virtualized data center may be used synonymously and interchangeably.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "temporary access token" as used herein refers to a temporary identity supplied to a resource for temporary use until a more permanent identity can be established. Furthermore, as used herein a "service provider" (SP) refers to a special type of service or resource that utilizes identities vended by a trusted identity service on behalf of other resources.

Finally, an "orchestration service" is another specialized resource or service that provides a mechanism for orchestrating the deployment, cloning, moving, terminating, etc. of virtual processing environments included within a physical processing environment.

Examples of SP's and orchestration services were provided in detail in U.S. patent application Ser. No. 11/583,667 entitled "Identity Controlled Data Center," filed on Oct. 19, 2006; the disclosure of which was incorporated by reference herein and above.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
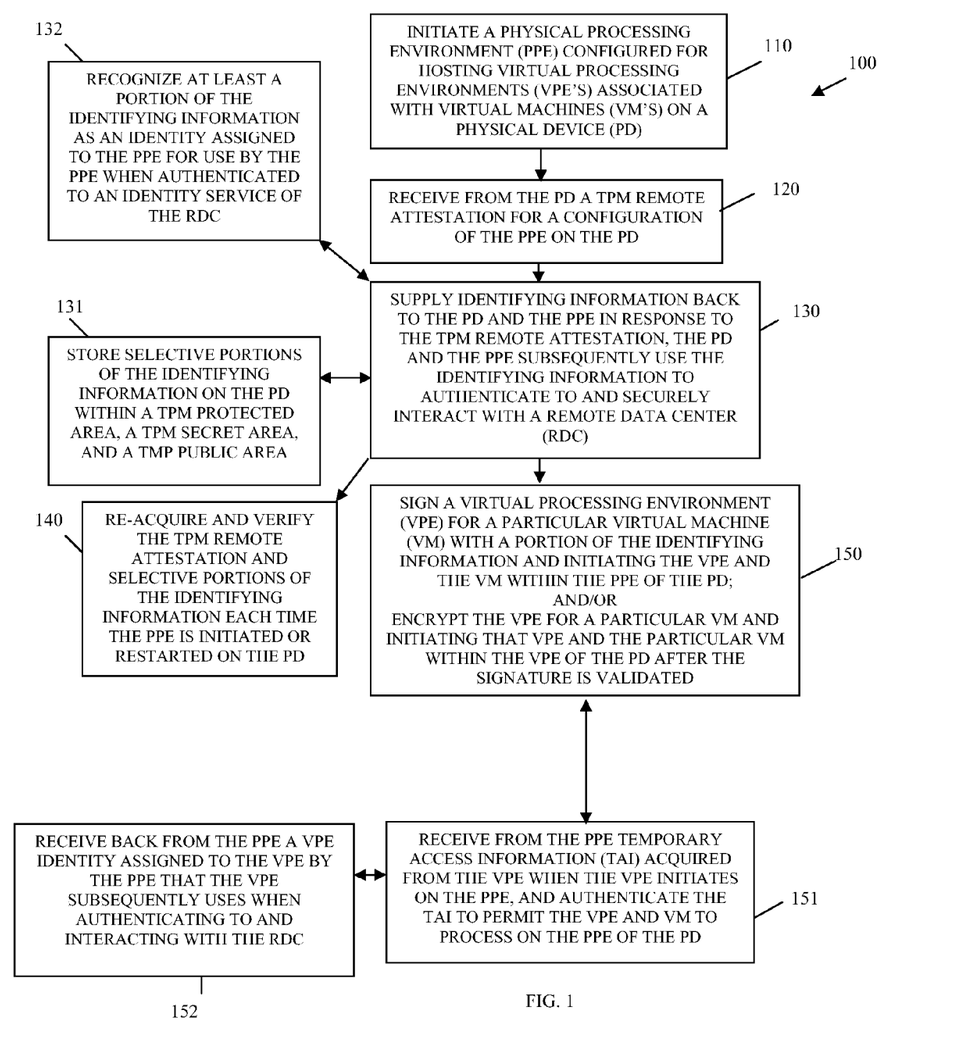
FIG. 1 is a diagram of a method for TPM assisted data center management, according to an example embodiment.

FIG. 1 is a diagram of a method 100 for TPM assisted data center management, according to an example embodiment. The method 100 (hereinafter "TPM enabled orchestration service") is implemented as instructions in a machine-accessible and computer-readable storage medium. The instructions when executed by a machine (computer or processor-enabled device) perform the processing depicted in FIG. 1. The TPM enabled orchestration service is also operational over and processes within a network. The network may be wired, wireless, or a combination of wired and wireless.

The TPM enabled orchestration service is operational within a remote data center. The remote data center provides processing environments to physical devices used by the data center. The processing environments can be physical processing environments on physical devices that have one or more virtual processing environments layered thereon for virtual machines (VM's).

The TPM enabled orchestration service is used to initially configure and deploy physical and virtual processing environments. It is noted that the physical devices that house the physical and virtual processing environments do not have to be within a local area network (LAN) although in some cases this can be the case. That is, the devices that comprise the remote data center's purview can be geographically dispersed over a wide-area network (WAN), such as the Internet. However, the TPM enabled orchestration service communicates securely with the physical devices, such that trust relationships can be established, via authentication mechanisms and in some cases via encrypted communications.

It is also noted that there is a tripartite trusted and verifiable relationship that exists between the TPM enabled orchestration service, the physical processing environment and the one or more virtual processing environments. In this relationship, the physical processing environment van validate the TPM enabled orchestration service to which it communicates and does this each time it communicates with the orchestration service. Likewise, the TPM enabled orchestration service validates the physical processing environment each time communication with the physical processing environment begins. The virtual processing environments also validate the physical processing environment when it is started and validates the TPM enabled orchestration service each time communication begins. Moreover, the physical processing environment validates the virtual processing environment prior to starting the virtual processing environment and validates the TPM enabled orchestration service when communication begins. So, there is a verifiable tripartite trusted relationship between the three parties. In some cases, the physical processing environment may be configured to also validate its underlying hardware on which it is installed each time it initiates on that hardware, this may occur by checking a previously used subnet versus a current subnet being used. It is also noted the orchestration service can actually validate the signatures of the underlying hardware for the physical processing environment.

So, in the embodiments discussed herein and below, the physical processing environment authenticates the virtual processing environment (prior to installing and prior to executing the virtual processing environment) and the physical processing environment also authenticates the TPM enabled orchestration service (prior to communicating with the TPM enabled orchestration service).

Likewise, the TPM enabled orchestration service has to authenticate the virtual processing environment (prior to sending the virtual processing environment out and prior to communicating with the virtual processing environment) and the TPM enabled orchestration service authenticates the physical processing environment (prior to sending a particular virtual processing environment to the physical processing environment and prior to communicating with the physical processing environment).

Additionally, the virtual processing environment has to authenticate the physical processing environment (prior to running on the physical processing environment) and the virtual processing environment has to authenticate the TPM enabled orchestration service (prior to communicating with the TPM orchestration service).

In an embodiment, the virtual processing environment is signed (along with its identity) to prove that it has not been tampered with. The signed virtual processing environment may also be encrypted with a key that only the desired or target physical processing environment knows and can use to decrypt the virtual processing environment. This allows the virtual processing environment to be "pinned" to a particular physical machine.

At 110, the TPM enabled orchestration service is directed according to policy or manual administrative direction to initiate/start a physical processing environment. The physical processing environment is configured for hosting one or more virtual processing environments that run one or more virtual machines (VM's) on a particular physical device.

In an embodiment, the physical device is equipped with a Generic Platform Module (GPM). The GPM may come equipped within the firmware of the physical device (such as a computer, server, router, gateway, proxy, network bridge, or other processor-enabled device). The GPM provides a protected area, a secret area, and a publicly accessible area available to the physical device along with cryptographic processing services. The protected area of the GPM provides for the creation of a public/private key pair, where the private portion of the key pair is stored in and never provided outside the context of the protected area but cryptographic functions can operate within the protected area to have access to the private key. The protected area can have many different private keys. The public part of the key is made available as a certificate and signed by the GPM, a third-party, and/or external entity, if needed. Functions available in the protected area include signature and encryption services for a data stream with stored public and private keys and providing remote attestation that concerns the initial installed operating state of the physical processing environment. The attestation is signed by a private key that is under the control of the GPM from the protected area and which can be validated via the certificate containing the matching public key in the public area.

The GPM also includes a sealed and secret storage area that can be used to persist content in a secure manner. The content may be obtainable by providing some secret content (such as a secret paraphrase) to cause the content to be released from the secret area. The content may also be made usable within the secret area of the GMP by providing some secret content as mentioned above to cause the content to be used in the secret area (such as using a private key to create a digital signature).

The public area of the GPM contains persistent content that is readily available from the physical device, such as the public key certificates of the physical device. In some cases, the GPM also includes an invariant or stable and unchanging serial number to uniquely identify the GPM.

A Trusted Platform Module (TPM) is a less capable instantiation of the GPM. The TPM provides a set of registers which record hash values for elements of the physical processing environment. Some typical hash values recorded within the registers include a hash of components of the physical processing environment's Basic Input/Output System (BIOS) and/or Operating System (OS). The hashes are computed at startup or boot time and stored in the registers controlled by the TPM.

An application or service (as described below) can specify certain hash values to be combined together and signed to create a TPM remote attestation. This remote attestation is sent by the TPM enabled orchestration service for validation (and sent perhaps with other data as described herein and below). The TPM enabled orchestration service verifies the remote attestation using a previously registered public key for the physical device or physical processing environment in which the TPM resides and by comparing the hash with a previously registered hash value for the physical processing environment.

Each time the physical processing environment is changed such that the hash value is different, the new hash value for the physical processing environment must be recorded by the TPM enabled orchestration service (discussed below) in a secure manner.

Also, an application or service can use the sealing capability of a TPM in order to bind data to a particular physical processing environment. To "seal" some piece of data, the application creates a key and encrypts the data with it. The key is then encrypted with certain register values from the TPM and stores that encrypted key. So, unless the physical processing environment that produced the initial register values within the TPM is exactly the same, the key cannot be decrypted nor can the data be decrypted.

Again, the physical processing environment is packaged as a set of code that provides functionality of a hosting virtualizing platform or processing environment.

After the TPM enabled orchestration service installs and/or initiates the physical processing environment on the physical device having the TPM, at 120, the TPM enabled orchestration service receives back from the TPM of the physical device a remote attestation for the configuration of the physical processing environment on the physical device. This may be a signed hash of the software resources and configuration of the physical processing environment, signed with a private key of the TPM protected area. In some cases, this attestation may be essentially registered by the TPM enabled orchestration service. This is processed as an authentication credential for the physical processing environment and provides one mechanism for validating the physical processing environment each time its communication begins with the TMP enabled orchestration service. This can be achieved by re-acquiring the TPM remote attestation each time the physical processing environment is started on the physical device and comparing that against the initial registered TPM remote attestation.

Next, at 130, the TPM enabled orchestration service supplies identifying information back to the physical device and the physical processing environment in response to the initial TPM remote attestation. The physical device and the physical processing environment subsequently use the identifying information to authenticate to and securely interact with the remote data center.

In an embodiment, at 131, the TPM enabled orchestration service causes selective portions of the identifying information to be stored on the physical device within the TPM protected area, the TPM secret area, and/or the TPM public area. So, some of the identifying information of the physical processing environment supplied by the orchestration service may include a unique private key for an identity of the physical device and/or physical processing environment. This private key is stored in the secret or protected area of the TPM. A corresponding public key certificate for the identity is stored in the public area of the TPM. Perhaps, an Internet Protocol (IP) address or an identity of an identity service that the physical device and the physical processing environment is to contact and authenticate to is stored in an area of the TPM and accessible via a phrase dynamically supplied by a challenger, such as the identity service, when authentication is desired. A variety of processing scenarios and types of identifying information can exist and the above was presented for purposes of illustration only.

In a particular situation, at 140, the TPM enabled orchestration service re-acquires and verifies the TPM remote attestation and also selective portions of the identifying information each time the physical processing environment is initiated or re-started on the physical device. This is done by checking the previously registered TPM remote attestation against the new TPM remote attestations supplied each time the physical processing environment is booted up on the physical device. Similarly, portions of the identifying information can be checked with each boot of the physical processing environment to ensure that it has not be tampered with and is what it was initially set to be.

According to an embodiment, at 150, the TPM enabled orchestration service subsequently (after the physical processing environment is validated and installed on the physical device) signs a virtual processing environment for a particular virtual machine. This virtual processing environment is signed using a private key such that the physical processing environment and the remote data center can both validate the signature of the virtual processing environment once provisioned with the public key, which may or may not be in a certificate. Also, at 130, the virtual processing environment can be encrypted for a particular virtual machine and then the virtual processing environment and the virtual machine initi-ated within the physical processing environment of the physical device after the signature is validated.

Continuing with the embodiment at 150 and at 151, the TPM enabled orchestration service receives from the physical processing environment temporary access information (e.g., identity, credentials, combinations of these things, etc.) acquired from the virtual processing environment for one time use when the virtual processing environment is initiated within the physical processing environment. This permits the virtual processing environment to be initially authenticated on first use within the physical processing environment.

Continuing with the embodiment at 151 and at 152, the TPM enabled orchestration service receives back from the physical processing environment a permanent virtual processing environment identity assigned to the virtual processing environment by the physical processing environment. This gets registered with the remote data center and is subsequently used for each subsequent initiation of the virtual processing environment when authenticating to and interacting with the remote data center.

It is noted that one virtual processing environment instantiation within a single physical processing environment can be assigned a different and unique identity from another instantiation of the same virtual processing environment on the same physical processing environment. Each can be tracked and authenticated separately and uniquely by the remote data center.

The remote data center, via the TPM enabled orchestration service, can authenticate and assign unique identities to physical processing environments and virtual processing environments installed thereon. The mechanisms used for achieving this is to leverage a physical devices TPM capabilities and to register TMP remote attestations and supply identifying information in concert with the attestations back to the physical devices that can be used to assign unique identities and authenticate communications between the physical processing environment/virtual processing environments and the remote data center. Policy can also be evaluated and used to make periodic checks of the physical processing environments and virtual processing environments to ensure they are not modified from their original condition and remain secure.

Figure 2:
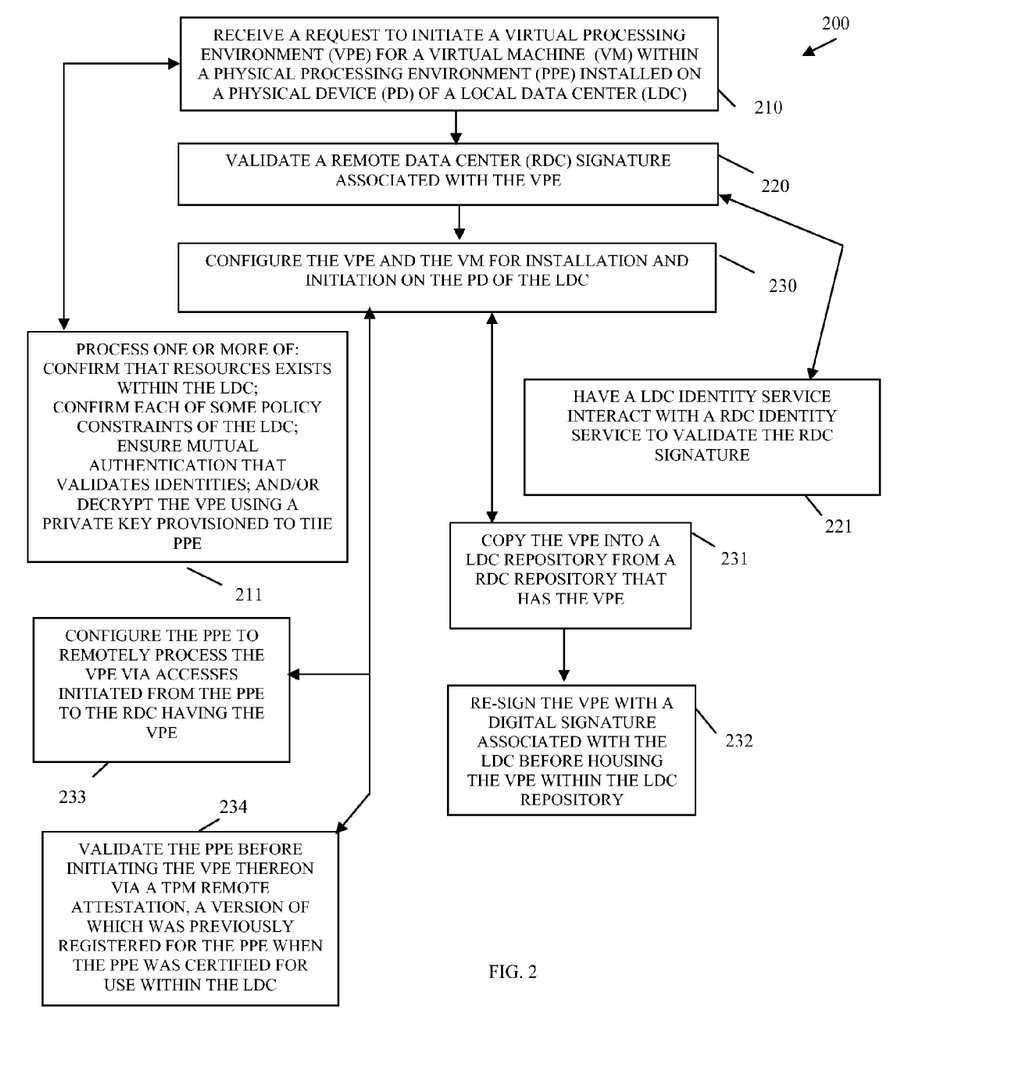
FIG. 2 is a diagram of another method for TPM assisted data center management, according to an example embodiment.

FIG. 2 is a diagram of another method 200 for TPM assisted data center management, according to an example embodiment. The method 200 (hereinafter "inter-data center communication service" is implemented in a machine-accessible and readable medium as instructions. The instructions when executed by a machine perform the processing depicted in the FIG. 2. Moreover, the inter-data center communication service is operational over a network, and the network may be wired, wireless, or a combination of wired and wireless.

The orchestration service represented by the method 100 of the FIG. 1 provides novel processing for instantiating, authenticating, and securely communicating with physical processing and virtual processing environments within a data center. The inter-data center communication service discusses techniques for inter-data center authentication and installation of virtual processing environments between two data centers.

At 210, the inter-data center communication service receives a request to initiate a virtual processing environment or a virtual machine (VM) within a physical processing environment installed on a physical device of a local data center. So, the inter-data center communication service operates within a particular data center, that particular data center is considered local from the perspective of the inter-data center communication service. It is noted that the remote data center includes its own instance of the inter-data center communication service and from its perspective the inter-data center communication service is remote. So, what is considered local and remote is dependent upon where the service being discussed is being processed.

According to an embodiment, at 211, the inter-data center communication service confirms that resources exist within the local data center to initiate the virtual processing environment or VM within a physical processing environment of the physical device. So, the existence and versions of particular drivers and software libraries are verified to ensure they are available for the virtual processing environment to satisfy the request. In addition, all policy constraints of the local data center, remote data center, and physical processing environment are satisfied.

In one case, at 211, the inter-data center communication service confirms that all or some policy constraints of the local data center, the physical processing environment, and the virtual processing environment are met.

In another situation, at 211, the inter-data center communication service ensures that mutual authentication between a requestor and the physical processing environment occurs and that validation of identities is properly presented.

In still another case, at 211, the inter-data center communication service validates identity information for the virtual processing environment.

In yet another situation, at 211, the inter-data center communication service decrypts the virtual processing environment using a private key previously provisioned to the physical processing environment.

It is noted that all the different embodiments of 211 can be done, just one of the embodiments, or various combinations of those embodiments.

At 220, the inter-data center communication service validates a remote data center signature associated with the virtual processing environment. In other words, the virtual processing environment is signed by the remote data center that is supplying it to the local data center and the inter-data center communication service, and the signature is verified before the processing continues.

In an embodiment, at 221, the inter-data center communication service has a local identity service of the local data center interact on its behalf with a remote identity service of the remote data center for purposes of validating the signature of the virtual processing environment.

At 230, the inter-data center communication service configures the virtual processing environment or the VM for installation and initiation on the selected physical device of the local data center. This is done after the resources are verified as being available for the virtual processing environment and after the signature of the remote data center is validated for the virtual processing environment and after all policy constraints have been validated as having been met.

According to an embodiment, at 231, the inter-data center communication service copies the virtual processing environment from a remote data center repository that is a source for the virtual processing environment. In some cases, at 232, the inter-data center communication service then re-signs the virtual processing environment with a digital signature of the local data center before the inter-data center communication service houses the newly signed virtual processing environment within a local data center repository.

In still another situation, at 233, the inter-data center communication service configures the physical processing environment to be prepared for remotely/externally processing the virtual processing environment, such configuration can permit the physical processing environment to interact with the inter-data center communication service to logically process the virtual processing environment from an external location that is external to the physical processing environment but still appears to be local to the physical processing environment. This is done to have the remote data center actually physically process the virtual processing environment, but it appears to be logically processed within the physical processing environment of the local data center.

In yet another case, at 234, the inter-data center communication service validates the physical processing environment before initiating the virtual processing environment thereon. This is done via a TPM remote attestation, where a previous version of the TPM remote attestation was registered for the physical processing environment when the physical processing environment was initially certified for use within the local data center. The details of this were discussed in detail above with reference to the method 100 of the FIG. 1.

Figure 3:
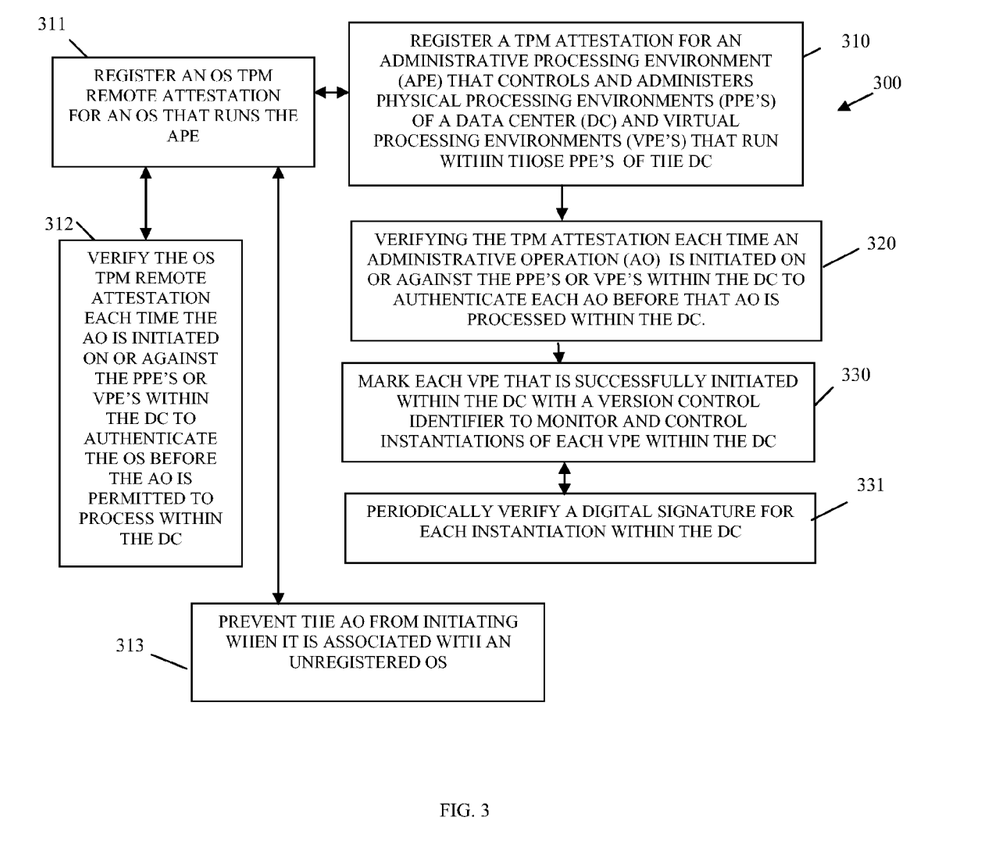
FIG. 3 is a diagram of yet another method for TPM assisted data center management, according to an example embodiment.

FIG. 3 is a diagram of another method 300 for TPM assisted data center management, according to an example embodiment. The method 300 (hereinafter "administrative data center control service" is implemented in a machine-accessible and readable medium as instructions. The instructions when executed by a machine perform the processing depicted in the FIG. 2. Moreover, the administrative data center control service is operational over a network, and the network may be wired, wireless, or a combination of wired and wireless.

The method 100 of the FIG. 1 describes deployment, control, and authentication of physical and virtual processing environments within a data center. The method 200 of the FIG. 2 describes inter-data center communications to install, authenticate, and control virtual processing environments communicated between two data centers. The administrative data center control service provides a mechanism for ensuring that the control operations that initiate operations associated with the methods 100 and 200 and other administrative data center operations are themselves authenticated and secure.

At 310, the administrative data center control service registers a TPM attestation for an administrative processing environment. The administrative processing environment controls and administers physical and virtual processing environments of a data center.

According to an embodiment, at 311, the administrative data center control service also registers an OS TPM remote attestation for an OS that runs the administrative processing environment. So, not only is the machine and processing environment that processes administrative data center functions registered but the OS that is used by that machine and processing environment is also registered via the OS TPM remote attestation.

Continuing with the embodiment at 311 and at 312, the administrative data center control service verifies the OS TPM remote attestation each time an administrative operation is initiated on or against the physical processing environments or the virtual processing environments within the data center. Alternatively, validation of the OS TPM remote attestation may only be presented and validated when communication begins between the administrative data center control service and the physical processing environment or the virtual processing environment in order to create an authentication session. This is done to authenticate the OS before the administrative operation is permitted to process within the data center. Similarly, at 313, the administrative data center control service prevents the administrative operation from initiating or ever processing when it is associated with an unregistered OS. This ensures the operating system of the administrative processing environment is secure each time an administrative operation is processed.

At 320, the administrative data center control service verifies the OS TPM remote attestation each time the administrative operation is initiated on or against the physical processing environments or virtual processing environments within the data center. Again, this is done to authenticate each and every administrative operation before that administrative operation is processed within the data center. Alternatively, validation of the OS TPM remote attestation may only be presented and validated when communication begins between the administrative data center control service and the physical processing environment or the virtual processing environment in order to create an authentication session.

According to an embodiment, at 330, the administrative data center control service marks each virtual processing environment that is successfully initiated within the data center with a version control identifier to monitor and control instantiations of each virtual processing environment within the data center. Additionally, at 331, the administrative data center control service periodically verifies a digital signature for each instantiation within the data center. Each instantiation includes its own unique signature that can be periodically validated according to policy by the administrative data center control service.

The administrative data center control service ensures that each and every administrative operation from a data center to install, control, track, and authenticate physical and virtual processing environments is itself authenticated and verified before that operation is permitted to process. The processing environment and devices that initiate the administrative operations are also authenticated. Again, this can be done via TPM attestations as discussed herein and above.

Figure 4:
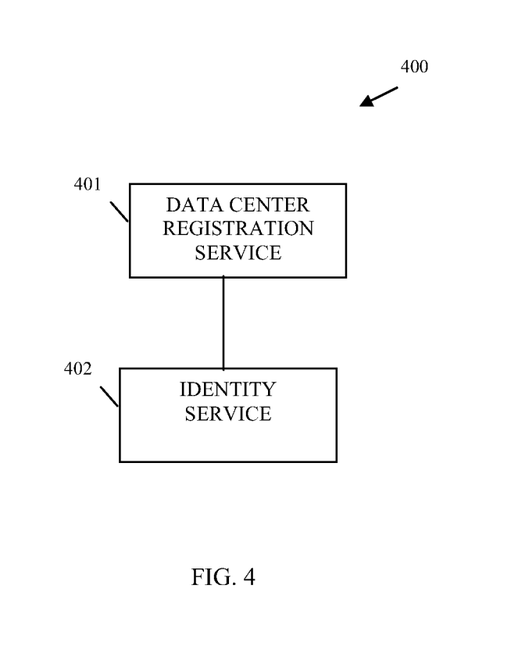
FIG. 4 is a diagram of a TPM assisted data center management system, according to an example embodiment.

FIG. 4 is a diagram of a TPM assisted data center management system 400, according to an example embodiment. The TPM assisted data center management system 400 is implemented as instructions on or within a machine-accessible and computer-readable storage medium. The instructions when executed by one or more machines (computer(s) or processor-enabled device(s)) perform various aspects of the processing depicted with respect to the methods 100 and 200 of the FIGS. 1 and 2, respectively; and the system 300 of the FIG. 3. The TPM assisted data center management system 400 is also operational over a network and the network may be wired, wireless, or a combination of wired and wireless.

The TPM assisted data center management system 400 includes a data center registration service 401 and an identity service 402. Each of these components and their interactions with one another will now be discussed in turn.

The data center registration service 401 is implemented in a computer-readable storage medium as instructions that process on one or more machines (computers or processor-enabled devices) over the network. Example aspects of the data center registration service 401 were discussed above with reference to the method 100 of the FIG. 1 and the method 300 of the FIG. 3.

The data center registration service 401 registers a TPM remote attestation received from a physical processing environment of a physical device when that physical processing environment is initiated on the physical device.

In an embodiment, the data center registration service 401 also registers an operating system that is used by the physical processing environment. The data center registration service 401 supplies registered TPM remote attestations to the identity service 402. In another embodiment, the data center registration service 401 also re-registers an OS that is used by a physical processing environment after approved updates or upgrades have been made.

The identity service 402 is implemented in a computer-readable storage medium as instructions that process on one or more machines of the network. Example aspects of the identity service 402 were discussed above with reference to the methods 100, 200, and 300 of the FIGS. 1-3, respectively.

The identity service 402 interacts with the physical processing environment during initiation of the physical processing environment on a physical device of a data center. The interaction yields identifying information that the identity service 402 generates and securely provides to the physical processing environment such as private/public key pairs, identities, etc.

The physical processing environment subsequently uses the TPM remote attestation generated by the physical device of the physical processing environment and the identifying information supplied from the identity service 402 (and a part of which may be stored and handled by the physical devices TPM) for authenticating and interacting with a data center to review commands, data, and/or virtual processing environments that execute within the physical processing environment as VM's.

In an embodiment, the identifying information includes a unique identity assigned within the data center for the physical processing environment and the physical device. The unique identity also includes credentials that are used to authenticate the identity within the data center via the identity service 402.

So, each virtual processing environment within the physical processing environment is configured to initially verify itself via interactions with the identity service when initiated on the physical processing environment. In some cases, the physical processing environment is packaged with its own local identity service that directly interacts with the identity service 402 on behalf of each of the virtual processing environments. The local identity service assigns unique virtual processing identities to each of the virtual processing environments for verification and use within the physical processing environment of the physical device. The local identity service can also register the virtual processing identities with the identity service 402 of the data center.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72 (b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method implemented as instructions within a non-transitory computer-readable medium for a trusted platform module (TPM) enabled orchestration service that when executed performs the method, comprising:

initiating a physical processing environment configured for hosting virtual processing environments associated with virtual machines on a physical device and encrypting the virtual processing environments with keys that just the physical processing environment has and can process for decrypting the virtual processing environments, permitting the virtual processing environments to be pinned to a physical machine having the physical processing environment once delivered to the physical processing environment;

receiving front the physical device a TPM remote attestation for a configuration of the physical processing environment on the physical device, the TPM remote attestation is a signed hash of software resources and the configuration for the physical processing environment including a hash of the Basic Input/Output System (BIOS) of the physical machine and the Operating System (OS) of the physical processing environment, the TPM remote attestation signed with a private key of a TPM protected area, the TPM remote attestation processed as an authentication credential for validating the physical processing environment each time the physical device communicates with the TPM enabled orchestration service, wherein the TPM remote attestation is initially registered with the TPM enabled orchestration service, and wherein the physical device includes a generic platform module (GPM) equipped within firmware of the physical device that provides the TPM protected area, the GPM including an unchanging serial number to uniquely identify the GPM and a sealed storage area that releases the private key for use within the TPM protected area upon providing a secret paraphrase, the TPM protected area is a less capable instantiation of the GPM, and the private key is stored within and never provided outside a context of the sealed storage area and TPM protected area, the GPM providing cryptographic functions that operate within the TPM protected area to gain access to the private key from the sealed storage via presentation the secret paraphrase, and wherein the physical processing environment validates underlying hardware of the physical processing environment each time the physical processing environment initiates on that underlying hardware by checking a previously used subnet of the physical processing environment against a current subnet that is used each time the physical processing environment initiates; and supplying identifying information back to the physical device and the physical processing environment in response to the TPM remote attestation, wherein the physical device and the physical processing environment subsequently use the identifying information to authenticate to and securely interact with a data center.

2. The method of claim 1 further comprising, re-acquiring and verifying the TPM remote attestation and selective portions of the identifying information each time the physical processing environment is initiated or restarted on the physical device.

3. The method of claim 1 further comprising one or more of:

signing a virtual processing environment for a particular virtual machine and initiating the virtual processing environment and the virtual machine within the physical processing environment of the physical device after a signature is validated; and encrypting the virtual processing environment for a particular virtual machine and initiating that virtual processing environment and the particular virtual machine within the virtual processing environment of the physical device after the signature is validated.

4. The method of claim 3 further comprising, receiving from the physical processing environment temporary access information acquired from the virtual processing environment when the virtual processing environment initiates on the physical processing environment, and authenticating the temporary access information to permit the virtual processing environment and virtual machine to process on the physical processing environment of the physical device.

5. The method of claim 1, wherein supplying further includes storing selective portions of the identifying information on the physical device within a TPM protected area and a TPM secret area.

6. The method of claim 5 further comprising, receiving back from the physical processing environment a virtual processing environment identity assigned to the virtual processing environment by the physical processing environment that the virtual processing environment subsequently uses when authenticating to and interacting with the data center.

7. The method of claim 1, wherein supplying further includes recognizing at least a portion of the identifying information as an identity assigned to the physical processing environment for use by the physical processing environment when authenticated to an identity service of the data center.

8. A machine-implemented system, comprising
a non-transitory computer readable storage medium having a data center registration service to process on a network; and
the non-transitory computer readable storage medium having an identity service to process on the network;
wherein the data center registration service is to register a trusted platform module (TPM) remote attestation received from a physical processing environment of a physical device when that physical processing environment is initiated on the physical device, and wherein during initiation the physical processing environment interacts with the identity service to acquire identifying information that is subsequently at least partially used by the physical processing environment in combination with the TPM remote attestation to authenticate to and interact with a data center to receive commands, data, and virtual processing environments that execute within the physical processing environment as virtual machines, and configuring the virtual processing environments with keys that just the physical processing environment has and can process for decrypting the virtual processing environments, permitting the virtual processing environments to be pinned to a physical machine having the physical processing environment once delivered to the physical processing environment, the TPM remote attestation is a signed hash of software resources and the configuration for the physical processing environment including a hash of the Basic Input/Output System (BIOS) of the physical machine and the Operating System (OS) of the physical processing environment, the TPM remote attestation signed with a private key of a TPM protected area, wherein the TPM remote attestation processed as an authentication credential for validating the physical processing environment each time the physical device communicates with the identity service, and wherein the physical device includes a generic platform module (GPM) equipped within firmware of the physical device that provides the TPM protected area, the GPM including an unchanging serial number to uniquely identify the GPM and a sealed storage area that releases the private key for use within the TPM protected area upon providing a secret paraphrase, the TPM protected area is a less capable instantiation of the GPM, and the private key is stored within and never provided outside a context of the sealed storage area and the TPM protected area, the GPM providing cryptographic functions that operate within the TPM protected area to gain access to the private key from the sealed storage via presentation of the secret paraphrase, and wherein the physical processing environment validates underlying hardware of the physical processing environment each time the physical processing environment initiates on that underlying hardware by checking a previously used subnet of the physical processing environment against a current subnet that is used each time the physical processing environment initiates.

9. The system of claim 8, wherein data center registration service also registers an operating system (OS) that is used by the physical processing environment.

10. The system of claim 8, wherein the identifying information includes a unique identity assigned within the data center for the physical processing environment and the physical device.

11. The system of claim 8, wherein each virtual processing environment within the physical processing environment is configured to initially verify itself via interactions with the identity service when initiated on the physical processing environment.

12. The system of claim 11, wherein the physical processing environment includes a local identity service that interacts with the identity service on behalf of the virtual processing environments, and wherein the local identity service assigns unique virtual processing environment identities to each of the virtual processing environments for verification and use within the physical processing environment of the physical device.

\* \* \* \* \*

UNITED STATES PATENT AND TRADEMARK OFFICE
CERTIFICATE OF CORRECTION

| | | |
|---|---|---|
| PATENT NO. | : 9,135,444 B2 | Page 1 of 1 |
| APPLICATION NO. | : 12/259382 | |
| DATED | : September 15, 2015 | |
| INVENTOR(S) | : Carter et al. | |

It is certified that error appears in the above-identified patent and that said Letters Patent is hereby corrected as shown below:

In the claims
Column 13, line 17, Claim 1, delete "front" and insert --from--, therefor.

Signed and Sealed this
Twenty-fourth Day of May, 2016

Michelle K. Lee
*Director of the United States Patent and Trademark Office*